United States Patent [19]

McCracken

[11] 4,194,767
[45] Mar. 25, 1980

[54] ROTARY JOINT

[75] Inventor: Donald G. McCracken, Horton, Mich.

[73] Assignee: Aeroquip Corporation, Jackson, Mich.

[21] Appl. No.: 903,652

[22] Filed: May 8, 1978

[51] Int. Cl.² .............................................. F16L 39/04
[52] U.S. Cl. .................................... 285/134; 285/190; 285/279
[58] Field of Search ............... 285/134, 135, 190, 267, 285/268, 269, 279, 281; 137/580

[56] References Cited

U.S. PATENT DOCUMENTS

| | | | |
|---|---|---|---|
| 1,934,717 | 11/1933 | Johnson | 285/135 |
| 2,385,421 | 9/1945 | Monroe | 285/269 X |
| 2,395,861 | 3/1946 | Fraser | 285/279 X |
| 2,700,558 | 1/1955 | Hieronymus | 285/269 X |
| 2,836,439 | 5/1958 | Moore | 285/134 |
| 3,265,411 | 8/1966 | Monroe et al. | 285/135 |

OTHER PUBLICATIONS

Catalog 867, Barco Rotary Joints, Aeroquip Corporation, Copyrighted 1975.

Primary Examiner—Dave W. Arola
Attorney, Agent, or Firm—Collins, Oberlin & Darr

[57] ABSTRACT

A joint structure for transmitting fluid therethrough and having a rotary, hollow sleeve comprised of two sections, each section being journalled in a bushing supported in a stationary casing surrounding the sleeve sections. The adjacent free ends of the sleeve sections are telescopically interfitted for relative axial movement and keyed to each other for unitary rotation. A sealing ring is axially slidably mounted on each sleeve section and urged into engagement with an adjacent sealing surface provided on the housing by forces acting in a direction compressing the sealing rings for providing a rotary joint structure having an extended service life.

5 Claims, 2 Drawing Figures

ROTARY JOINT

BACKGROUND OF THE INVENTION

1. Field of the Invention

This invention generally relates to rotary joints, and more particularly to improvements in rotary joint structures, for connecting a stationary fluid supply line to a rotating device.

2. Description of the Prior Art

Rotary joints are employed in installations connecting a stationary fluid supply line to rotary devices, such as steam heated drying drums, where they are subjected to substantial vibrations and high stresses due to misalignment and wide temperature changes. In the past, known rotary joints employed in such installations failed after short periods of service, and repair or replacement of the joints was frequently required.

SUMMARY OF THE INVENTION

According to the present invention, an improved rotary joint structure having an extended service life has been provided by incorporating in the joint structure a rotary, two-section, hollow sleeve wherein each sleeve section is journalled in a bearing mounted in a stationary housing. A sealing ring is slidably mounted on each sleeve section, and each sleeve section is provided with a thrust flange so that biasing means disposed therebetween urge the rings into sealing engagement with a sealing surface provided on the stationary housing in such a manner as to circumferentially compress the sealing rings.

OBJECTS AND ADVANTAGES

An object of this invention is to provide an improved rotary joint structure that has a long service life and is easily reconditioned.

Another object of this invention is to provide an improved rotary joint structure that is simple in construction, economical to manufacture and efficient in operation.

Yet another object is to provide a rotary joint structure including a rotary two-section sleeve which is positively supported and wherein seals slidably mounted thereon are subject to compressive forces rather than tensile forces.

Other objects and advantages will become more apparent during the course of the following description, when taken in connection with the accompanying drawing.

BRIEF DESCRIPTION OF THE DRAWING

In the drawing, wherein like numerals are employed to designate like parts throughout the same.

DESCRIPTION OF THE PREFERRED EMBODIMENT

Figure 1:
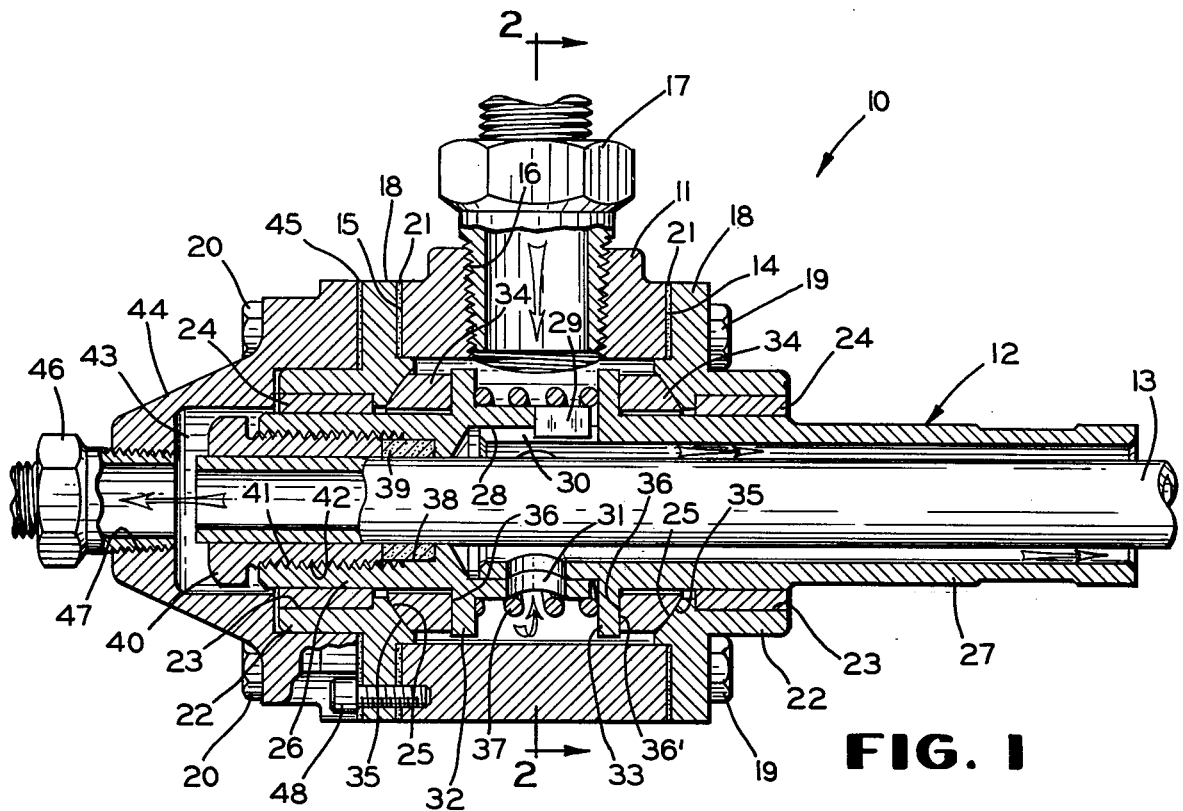
FIG. 1 is a side sectional view of a rotary joint constructed in accordance with the invention.

Referring now to FIG. 1, there is illustrated a rotary joint designated in its entirety by the reference numeral 10 which embodies the present invention. Briefly, the rotary joint 10 comprises a centrally disposed stationary housing 11 which encases a rotatable sleeve member 12 adapted to be connected in a conventional manner, to a hollow journal (not shown) extending from a rotary device such as a steam heated drying roll (also not shown). The joint structure 10 also includes an axially extending concentric rotary siphon pipe 13 for the removal of condensate from the drying roll.

Figure 2:
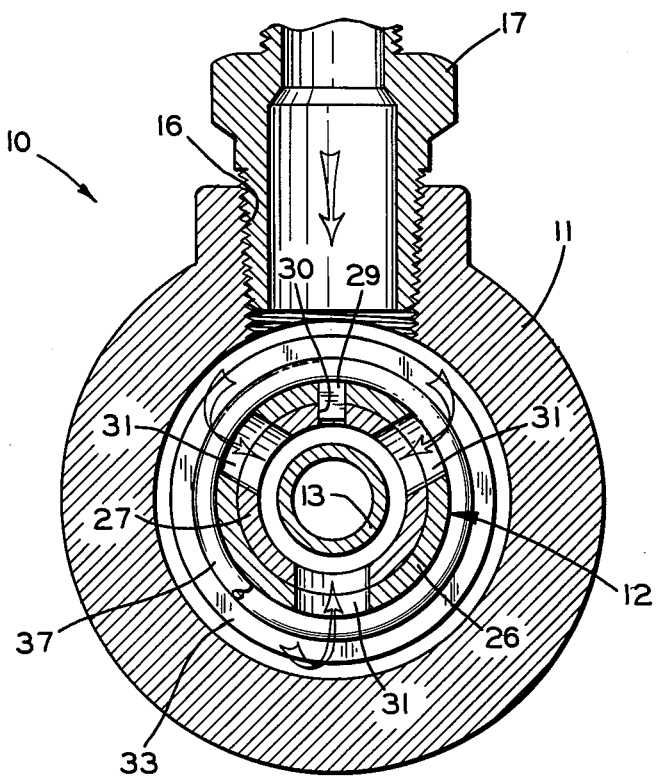
FIG. 2 is a transverse sectional view taken substantially along line 2—2 of FIG. 1.

As illustrated in FIGS. 1 and 2, the stationary housing 11 is a tubular section of cylindrical form having opposed open ends 14 and 15 and is provided with a threaded fluid inlet port 16 for receiving the threaded end of a stationary fluid supply hose fitting 17. As shown in FIG. 1, a centrally apertured end cap 18 is attached to each of the open ends 14 and 15 by cap screws 19 and 20, respectively. A gasket 21 is provided to seal each end cap 18 to its adjacent housing ends 14 and 15.

Each end cap 18 is provided with an outwardly extending hub 22 which is counterbored as at 23 to receive a bushing 24. The inner face of each end cap is provided with spherical sealing surface 25, the purpose of which will be described in detail hereinafter.

In accordance with the invention, the hollow sleeve member 12 comprises an inner sleeve section 26 and an outer sleeve section 27, each sleeve section 26 and 27 being journalled in one of the bushings 24. One end of the inner sleeve section 26 is counterbored as at 28 to telescopically receive the adjacent free end of the outer sleeve section 27, the free end having a smaller diameter than the bearing portion of the sleeve section. To cause the inner sleeve section 26 to rotate with the outer sleeve section 27, a radially inwardly extending key 29 is attached, as by welding, to the counterbored end of the inner sleeve section 26, and the adjacent end of the outer sleeve 27 is provided with an axially extending keyway 30 into which the key 29 projects. The telescoped ends of the sleeve sections 26 and 27 are provided with a plurality, in this case three, aligned fluid ports 31. Somewhat remote therefrom, the sleeve sections 26 and 27 are provided with thrust flanges 32 and 33, respectively, extending radially outwardly therefrom.

A high-density carbon sealing ring 34 is mounted on each sleeve section 26 and 27 intermediate the respective thrush flange 32 or 33 and the inner face of its adjacent end cap 18. Each sealing ring 34 is provided with a spherical sealing surface 35 engaging the spherical sealing surface 25 provided on the inner face of the end cap 18 and a planar sealing surface 36 engaging the face 36' of the adjacent thrust flange 32 or 33. A compression spring 37 disposed between the thrust flanges 32 and 33 and surrounding the telescoped ends of the sleeve sections urges the sleeve sections axially apart to firmly seat the sealing surfaces 35 and 36 on the sealing rings 34 against the adjacent sealing surfaces 25 provided on the end caps 18 and the planar sealing surfaces 36' provided on the thrust flanges 32 and 33, respectively. At this point, it should be noted that this joint construction produces forces which place the carbon sealing rings 34 in compression circumferentially and, as carbon material is stronger in compresson loading than in tensile loading, the life of the sealing ring is consequently significantly increased. Also, it should be noted that this construction automatically compensates for wear of the sealing rings 34.

As previously mentioned, the rotary joint 10 is provided with a rotary siphon pipe 13. Therefore, the inner sleeve section 26 is provided with a concentric bore 38 for receiving the free end of the siphon pipe 13. An annular packing ring 39, disposed within the bottom of the bore 38, is compressed by a packing gland 40 to firmly hold and seal the free end of the siphon pipe 13 to the inner sleeve section 26. As shown in FIG. 1, the packing gland 40 is provided with external threads 41 which engage with internal threads 42 provided in the concentric bore 38. Accordingly, the siphon pipe 13 is held in sealed communication with a drainage chamber 43 defined by a siphon cap 44 and the end of the inner sleeve section 26. The siphon cap 44 is attached to the adjacent end cap 18 by the cap screws 20 attaching the end cap 18 to the open end 15 of the housing 11. The end cap 18 is held in assembled position on the housing end 15 by a pair of cap screws 47 (only one shown) during installation of the joint 10 in a working environment. A gasket 45 is provided between the siphon cap 45 and the end cap 18 to seal the chamber 43, which is emptied through a drain hose fitting 46 threadedly connected to an outlet port 47 provided in the siphon cap 44.

In operation, fluid under pressure, such as steam, flows from the supply pipe 17, enters the inlet port 16 and flows through the ports 31 in the hollow sleeve 12 and then axially along the chamber between the sleeve and the siphon pipe 13 into the rotated device (not shown). The pressure of the flowing fluid, along with the force of the spring 37, urges the thrust flanges 32 and 33 of the sleeve sections 26 and 27 axially apart to firmly seat their adjacent seal rings 34 against the sealing surfaces 25 and 36' provided on the adjacent end caps 18 and the planar sealing surface 36 on the thrust flanges 32 and 33, respectively.

Since the sleeve sections 26 and 27 are positively supported in the bushings 24 which are widely spaced apart, and their free ends and telescopically interfitted, the hollow sleeve 12 forms a "rigid" support for the seal rings 34. Accordingly, the rotary joint structure 10 overcomes the problems caused by substantial vibrations and high stresses due to misalignment and wide temperature changes. Also, since the seal rings 34 are loaded in compression, their life, and thus the life of the joint, is substantially extended over existing rotary joints of this type.

It is to be understood that the form of the invention herewith shown and described is to be taken as an illustrative embodiment only of the same, and that various changes in the shape, size and arrangement of the parts may be resorted to without departing from the spirit of the invention.

I claim:

1. In a rotary joint for transmitting fluids therethrough, the combination comprising:
   a. a stationary tubular housing having opposed open ends;
   b. an end cap affixed to each opposed open end of said housing, each said end cap having a spherical sealing surface on its inner face and a bearing receiving portion extending outwardly thereof;
   c. a rotatable sleeve concentrically journalled within said end caps, said sleeve comprising a pair of axially aligned sections connected together for unitary rotation and axial movement relative to each other within said housing, each said sleeve section extending beyond said spherical sealing surface of said end caps;
   d. a bearing disposed within the bearing receiving portion of each said end cap for journalling the end of each of said sleeve section extending beyond said spherical sealing surfaces;
   e. a sealing ring mounted for axial movement on each said sleeve section, each said sealing ring having a spherical sealing surface for intimately engaging the adjacent spherical sealing surface on said end caps; and
   f. means biasing said sleeve sections and said sealing rings axially apart for urging said sealing rings into sealing engagement with said spherical sealing surfaces on said end caps, wherein said sealing rings are "rigidly" supported by said sleeve sections and the sealing surfaces of said end caps and sealing rings and the forces urging said sealing rings into sealing engagement with said end caps tend to circumferentially compress said sealing rings.

2. A rotary joint as claimed in claim 1, wherein the free end of one sleeve section is counterbored for telescopically receiving the free end of the other said sleeve section, the free ends being keyed together for unitary rotation and axial movement relative to each other.

3. A rotary joint as claimed in claim 2, wherein said means for biasing said sleeve sections apart comprises thrust flanges radially projecting from each said sleeve section adjacent their telescoped ends, said flanges abutting said sealing rings, and a compression spring disposed between said thrust flanges for urging the spherical sealing surfaces on said sealing rings into sealing engagement with the sealing surfaces on said end cap.

4. A rotary joint as claimed in claim 3, wherein each said sealing ring includes a planar sealing surface in abutting sealing engagement with faces on said thrust flanges.

5. A rotary joint as claimed in claim 1, claim 2 or claim 3, including a siphon pipe wherein one of said sleeve sections includes means for receiving and sealingly clamping an end of said siphon pipe thereto for unitary rotation with said sleeve section.

* * * * *